United States Patent
Mizumaki

(10) Patent No.: US 6,727,672 B2
(45) Date of Patent: Apr. 27, 2004

(54) DRIVING DEVICE AND LIGHT AMOUNT CONTROLLER

(75) Inventor: Masao Mizumaki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 19 days.

(21) Appl. No.: 10/093,742

(22) Filed: Mar. 11, 2002

(65) Prior Publication Data

US 2002/0125843 A1 Sep. 12, 2002

(30) Foreign Application Priority Data

Mar. 12, 2001 (JP) ..................................... 2001-068272
May 11, 2001 (JP) ..................................... 2001-141411

(51) Int. Cl.⁷ .............................................. H02K 23/16
(52) U.S. Cl. ...................... 318/437; 318/685; 318/696; 318/640; 318/254; 310/49; 359/227; 359/230
(58) Field of Search ................................ 318/685, 696, 318/640, 437, 254; 310/49; 359/227, 230

(56) References Cited

U.S. PATENT DOCUMENTS

| | | | | |
|---|---|---|---|---|
| 4,804,873 A | * | 2/1989 | Shiraki et al. | 310/67 R |
| 5,384,506 A | * | 1/1995 | Aoshima | 310/49 R |
| 5,523,815 A | * | 6/1996 | Tamura | 396/508 |
| 5,555,059 A | * | 9/1996 | Seo et al. | 396/463 |
| 5,831,356 A | * | 11/1998 | Aoshima | 310/49 R |
| 5,917,303 A | * | 6/1999 | Depatie et al. | 318/685 |
| 5,952,058 A | * | 9/1999 | Xuan | 427/555 |
| 6,081,053 A | * | 6/2000 | Maegawa et al. | 310/49 R |
| 2002/0047313 A1 | | 4/2002 | Aoshima | 310/10 |

FOREIGN PATENT DOCUMENTS

| | | |
|---|---|---|
| JP | 53-2774 | 1/1978 |
| JP | 57-166847 | 10/1982 |
| JP | 7-213041 | 8/1995 |
| JP | 2000-50601 | 2/2000 |

* cited by examiner

Primary Examiner—Rita Leykin
(74) Attorney, Agent, or Firm—Fitzpatrick, Cella, Harper & Scinto

(57) ABSTRACT

There is provided a small-sized and slim driving device which is easy to manufacture and capable of producing high output. A magnet has a cylindrical shape, and at least the outer peripheral surface of the magnet is circumferentially divided into n sections magnetized so as to have alternately different poles. The magnet can rotate about a rotational axis of the cylindrical shape. A coil is arranged axially of the magnet and parallel thereto. An outer magnetic pole portion is disposed to be magnetized by the coil, and has a plurality of hair comb tooth-shaped portions opposed to the magnet and arranged around the magnet such that an angle corresponding to the circumferential width of each of the hair comb tooth-shaped portions opposed to the magnet about the rotational axis of the hollow cylindrical shape of the magnet is equal to a predetermined angle A. An inner magnetic pole portion is disposed to be magnetized by the coil, and has a hollow cylindrical shape opposed to the inner peripheral surface of the magnet. The predetermined angle A is set to such a value that a rotational force acts on the magnet to return to a position in which a boundary between adjacent ones of the n sections having alternately different poles is opposed to a circumferential center of a corresponding one of the hair comb tooth-shaped portions of the outer magnetic pole portion, when the boundary shifts from the position.

18 Claims, 11 Drawing Sheets

DRIVING DEVICE AND LIGHT AMOUNT CONTROLLER

BACKGROUND OF THE PRESENT INVENTION

1. Field of the Present Invention

The present invention relates to a driving device having an extremely compact size, and a light amount controller and a shutter using the driving device.

2. Description of the Related Art

Conventionally, motors that can be designed to be compact in size include a brushless motor. Brushless motors with simple driving circuits include a stepper motor, described below.

FIG. 9 shows an example of a small-sized hollow cylindrical stepper motor. The stepper motor includes two stators 102 each comprised of a bobbin 101 having a stator coil 105 concentrically wound thereon, two stator yokes 106 axially fixedly holding the bobbin 101 in a sandwiching fashion, the stator yokes 106 each having stator teeth 106a and 106b alternately arranged circumferentially about an inner peripheral surface of the bobbin 101, and a casing 103 to which are secured the stator yokes 106 formed integrally with the respective stator teeth 106a and 106b. One of the two casings 103 has a flange 115 and a bearing 108 fixed thereto, while the other casing 103 has another bearing 108 fixed thereto. A rotor 109 is comprised of a rotor magnet 111 rigidly fitted on a rotor shaft 110. The rotor magnet 111 defines radial gaps between the same and the stator yokes 106 of the stators 102. The rotor shaft 110 is rotatably supported by the two bearings 108 on opposite ends thereof.

A light controller using a variation of the stepper motor constructed as above has been proposed in Japanese Patent Publication (Kokoku) No. 53-2774. The light controller controls the quantity of passing light by opening and closing shutter blades connected to the stepper motor, in a stepwise fashion. Another variation is a hollow motor proposed in Japanese Laid-Open Patent Publication (Kokai) No. 57-166847. The hollow motor is a ring-shaped stepper motor which allows light to pass through a cavity formed in a central portion thereof.

In the above conventional small-sized stepper motor shown in FIG. 9, however, the casings 103, the bobbins 101, the stator coils 105 and the stator yokes 106 are concentrically arranged around the rotor 109, which inevitably results in increased outer dimensions of the motor. Further, magnetic flux generated by energization of the stator coils 105 mainly flows between the end faces 106a1 of the stator teeth 106a and the end faces 106b1 of the stator teeth 106b as shown in FIG. 10, and hence the magnetic flux does not effectively act on the rotor magnet 111.

Similarly, the light controller proposed in Japanese Patent Publication (Kokoku) No. 53-2774 and the hollow motor proposed in Japanese Laid-Open Patent Publication (Kokai) 57-166847 each have stator coils and stator yokes arranged around a rotor magnet, so that the outer dimensions of the motor are increased, and magnetic flux generated by energization of the stator coils does not effectively act on the rotor magnet.

Further, a coin-shaped brushless motor as shown in FIG. 11 has been proposed, e.g., in Japanese Laid-Open Patent Publications (Kokai) No. 7-213041 and No. 2000-50601. The brushless motor is comprised of a plurality of coils 301, 302, 303 and a disk-shaped magnet 304. As shown in FIG. 11, each of the coils has a thin coin-like shape, and is disposed such that the axis thereof extends parallel with that of the magnet. The disk-shaped magnet is magnetized in the axial direction thereof, and is disposed such that the magnetic surface (inner peripheral surface) of the magnet faces in a direction perpendicular to the axis of each of the coils.

In this motor, as illustrated by arrows in FIG. 12, magnetic flux generated by the coils cannot fully effectively act on the magnet. Further, the center of a rotational force or torque generated by the magnet is away from the outer periphery of the motor by a distance of L, so that the torque generated by the motor is small for the size of the motor. In addition, since a central portion of the motor is occupied by the coils and the magnet, it is difficult to utilize this portion for some other purposes.

SUMMARY OF THE PRESENT INVENTION

It is a first object of the present invention to provide a small-sized and slim driving device which is easy to manufacture and capable of producing high output.

It is a second object of the present invention to provide a light amount controller using a small-sized and slim driving device which is easy to manufacture and capable of producing high output.

To attain the first object, in a first aspect of the present invention, there is provided a driving device comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, wherein the predetermined angle A is set to such a value that a rotational force acts on the magnet to return to a position in which a boundary between adjacent ones of the n sections having alternately different poles is opposed to a circumferential center of a corresponding one of the hair comb tooth-shaped portions of the outer magnetic pole portion, when the boundary shifts from the position.

To attain the second object, in a second aspect of the present invention, there is provided a light amount controller comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, and a light amount control member disposed for rotation in a manner interlocked to the magnet, wherein the predetermined angle A is set to such a value that a rotational force acts on the magnet to return to a position in which a boundary between adjacent ones of the n sections having alternately different poles is opposed to a circumferential center of a corresponding one of the hair comb tooth-shaped portions of the outer magnetic pole portion, when the boundary shifts from the position.

To attain the second object, in a third aspect of the present invention, there is provided a light amount controller comprising a magnet having a hollow cylindrical shape and having an outer peripheral surface and an inner peripheral surface, at least the outer peripheral surface being circumferentially divided into n sections magnetized so as to have alternately different poles, the magnet being rotatable about a rotational axis of the hollow cylindrical shape thereof, a coil arranged axially of the magnet and parallel thereto, an outer magnetic pole portion disposed to be magnetized by the coil, the outer magnetic pole portion having a plurality of hair comb tooth-shaped portions opposed to the magnet and arranged around the magnet such that an angle corresponding to a circumferential width of each of the hair comb tooth-shaped portions opposed to the magnet about the rotational axis of the hollow cylindrical shape of the magnet is equal to a predetermined angle A, and an inner magnetic pole portion disposed to be magnetized by the coil, the inner magnetic pole portion having a hollow cylindrical shape opposed to the inner peripheral surface of the magnet, a light amount control member being openable and closable in a manner interlocked to the magnet to thereby control an amount of light passing through the inner magnetic pole portion, and control means for controlling the light amount control member by selectively switching between a first state in which the magnet is held at a predetermined rotational position by attractive forces of the magnet and the outer magnetic pole portion when the coil is deenergized and a second state in which the magnet is rotated in a normal direction through a first predetermined angle from the first state by normal energization of the coil, and a third state in which the magnet is rotated in a direction opposite to the normal direction through a second predetermined angle from the first state by reverse energization of the coil, wherein the predetermined angle A is set to such a value that a rotational force acts on the magnet to return to a position in which a boundary between adjacent ones of the n sections having alternately different poles is opposed to a circumferential center of a corresponding one of the hair comb tooth-shaped portions of the outer magnetic pole portion, when the boundary shifts from the position.

In the first to third aspects of the present invention, preferably, assuming that the magnet has an outer diameter of D1 and an inner diameter of D2, the predetermined angle A is set to satisfy a condition defined by an expression:

$$A > (248.4/n) - 58.86 \times (D1-D2)/(D1 \times \pi).$$

In the first to third aspects of the present invention, preferably, each of the hair comb tooth shaped portions of the outer magnetic pole portion has an axial length larger than a height of the outer peripheral surface of the magnet.

In the second and third aspects of the present invention, preferably, the light amount control member is openable and closable in a manner interlocked to the magnet to thereby control an amount of light passing through the inner magnetic pole portion.

According to the first to third aspects, the outer diameter of the driving device is determined by the outer magnetic pole portion opposed to the outer peripheral surface of the magnet, the inner diameter of the driving device is determined by the inner magnetic pole portion opposed to the inner peripheral surface of the magnet, and the axial height of the driving device is determined by the axial arrangement of the coil and the magnet. As a result, it is possible to largely reduce the size of the driving device. Further, the magnetic flux generated between the outer magnetic pole pieces and the inner magnetic pole portion magnetized by excitation of the coil crosses the magnet arranged between the magnetic pole pieces and member, and hence effectively acts on the magnet.

Furthermore, assuming that the angle corresponding to the circumferential width of each hair comb tooth-shaped portion of the outer magnetic pole portion opposed to the magnet about the rotational axis of the hollow cylindrical shape of the magnet is equal to the predetermined angle A, and the magnet has n magnetized poles, an outer diameter of D1 and an inner diameter of D2, the condition defined by the expression of $A > (248.4/n) - 58.86 \times (D1-D2)/(D1 \times \pi)$ holds. Therefore, when the coil is not energized, the center of each magnetized pole of the magnet can be stably held at a position opposed to the center of a corresponding hair comb tooth-shaped portion of the outer magnetic pole portion.

Moreover, since each hair comb tooth-shaped portion of the outer magnetic pole portion is configured to have an axial length larger than the height of the outer peripheral surface of the magnet, a force axially exerted on the magnet by the outer magnetic pole portion and the inner magnetic pole portion is reduced. As a result, sliding friction between the magnet and members holding the magnet in the axial direction is reduced, which enables smooth rotation of the magnet.

Further, the light amount controller according to the second and third aspects of the present invention includes the above driving device, and the light amount control member connected to the magnet of the driving device, for pivotal motion for control of the amount of light passing through the inside of the hollow cylindrical inner magnetic pole portion, and it is possible to allow light to pass through the central portion of the driving device.

Moreover, according to the third aspect of the present invention, it is possible to switch the light amount-controlled state between three different light amount-controlled states by changing the state and direction of energization of the coil.

The above and other objects, features, and advantages of the present invention will become more apparent from the following detailed description taken in conjunction with the accompanying drawings.

DETAILED DESCRIPTION OF THE PREFERRED EMBODIMENTS

The present invention will now be described in detail with reference to the drawings showing embodiments thereof.

Figure 1:
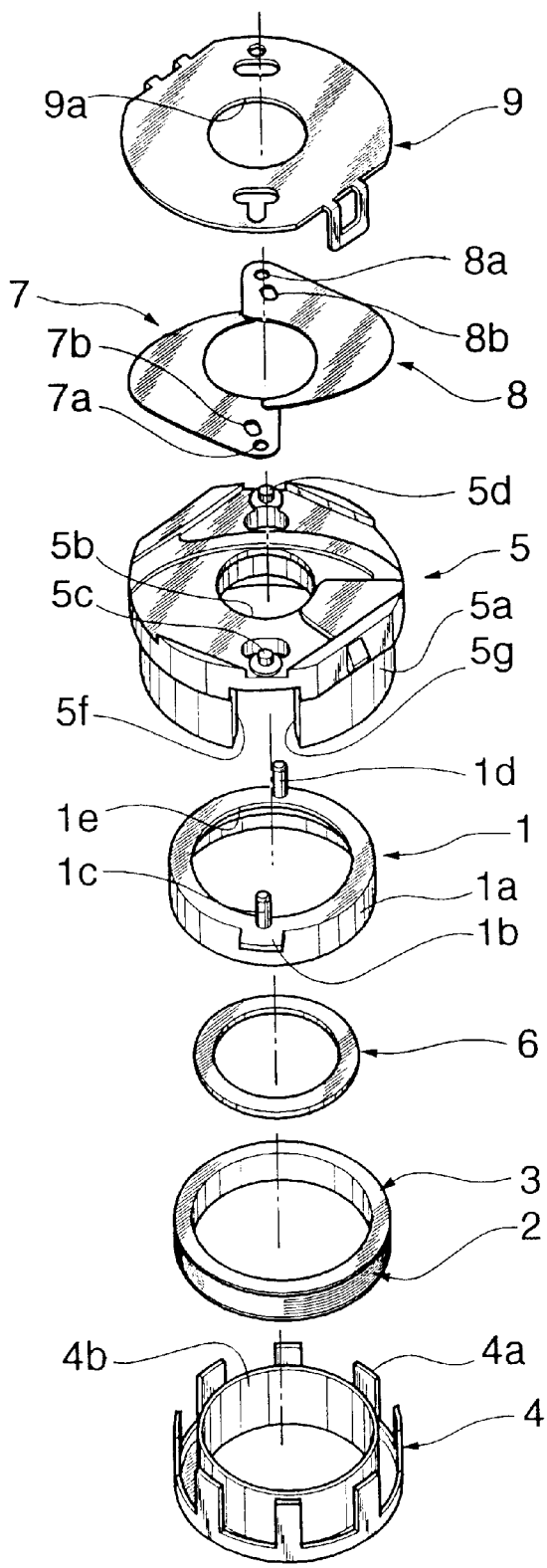
FIG. 1 is an exploded perspective view of a light amount controller equipped with a driving device according to a first embodiment of the present invention.
Figure 2:
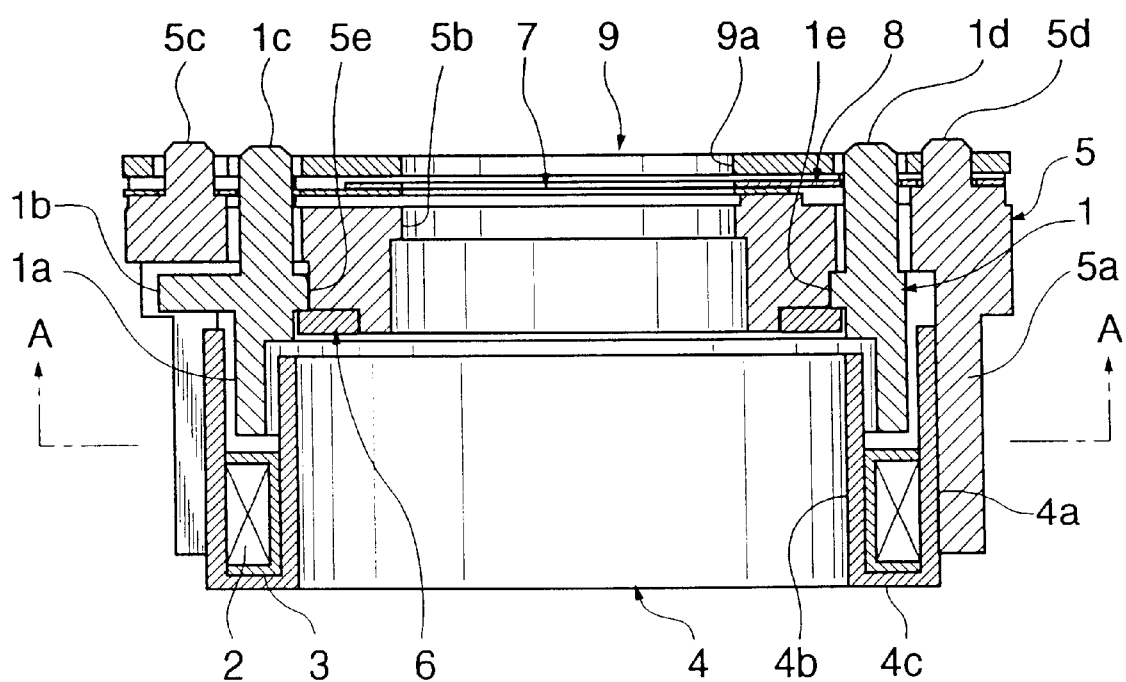
FIG. 2 is an axial cross-sectional view showing an assembled state of the light amount controller of FIG. 1.
Figure 3A:
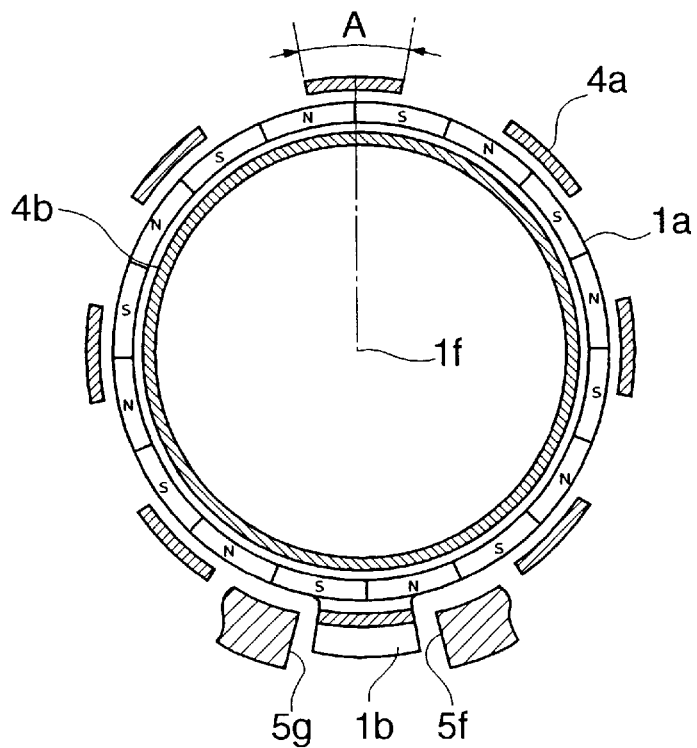
FIG. 3A is a transverse cross-sectional view showing a state in which a magnet 1 appearing in FIG. 1 is in stoppage due to a cogging force when a coil 2 is deenergized.
Figure 3B:
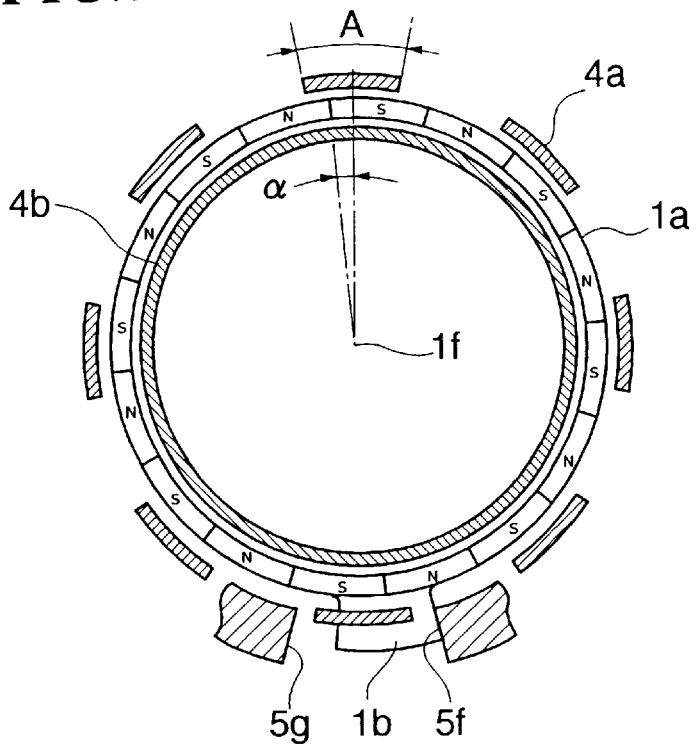
FIG. 3B is a transverse cross-sectional view showing a state in which a projection 1b of the magnet 1 appearing in FIG. 1 is in abutment with a stopper portion 5f of a base board 5 when the coil 2 is normally energized.
Figure 3C:
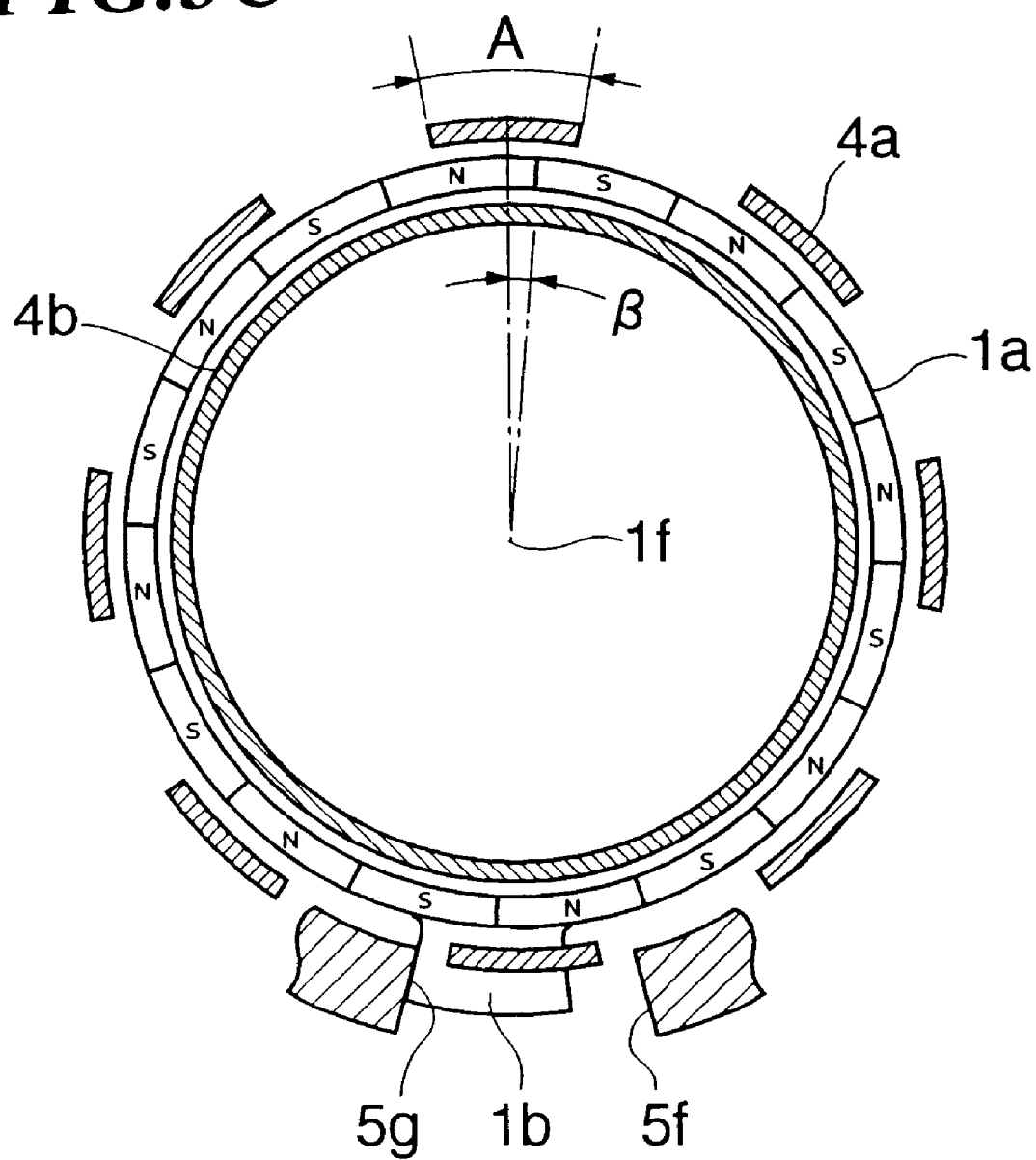
FIG. 3C is a transverse cross-sectional view showing a state in which the projection 1b of the magnet 1 appearing in FIG. 1 is in abutment with a stopper portion 5g of the base board 5 when the coil 2 is reversely energized.

FIGS. 1 to 3C show a light amount controller according to a first embodiment of the present invention. FIG. 1 is an exploded perspective view of the light amount controller equipped with a driving device according to the first embodiment. FIG. 2 is an axial cross-sectional view of an assembled state of the light amount controller equipped with the driving device shown in FIG. 1, while FIGS. 3A to 3C are cross-sectional views taken on line A—A of FIG. 2, which are useful in explaining rotating operations of a magnet of the driving device.

In FIGS. 1 to 3C, reference numeral 1 designates a hollow cylindrical magnet forming a rotor. As shown in FIG. 3A, the magnet 1 has a magnetized portion 1a which is formed by circumferentially dividing the magnet 1 into n sections (sixteen sections in the present embodiment) and permanently magnetizing the n sections such that they alternately have an S pole and an N pole along the outer peripheral side. Although in FIGS. 3A and 3B, the magnetized portion 1a is represented by the outer peripheral side portion, actually, the magnetized portion 1a has an inner peripheral side portion having respective sections corresponding to the above n sections and having opposite poles to the respective poles of the n sections of the outer peripheral side portion. The magnet 1 is formed by injection molding a plastic magnet material, which allows the hollow cylinder (particularly, the magnetized portion 1a) to have a very small radial thickness. Further, the magnet 1 is formed integrally with a projection 1b for limiting rotation of the magnet 1, dowels 1c and 1d projecting in the axial direction, and an engaging portion 1e slightly protruding toward the central opening of the magnet 1. The magnet 1 is rotatably supported by a base board 5, described hereinafter, in such a manner that the engaging portion 1e is slidably engaged with an engaging portion 5e of the base board 5.

Since the magnet 1 is formed by injection molding of the plastic magnet material formed as described above, it can be easily manufactured despite its complicated shape having the projection 1b, the dowels 1c and 1d, and the engaging portion 1e. Further, since the magnet 1 has the engaging portion 1e formed integrally therewith, the accuracy of concentricity of the engaging portion 1e and the magnet main body with respect to the rotational axis thereof is enhanced, which makes it possible to reduce shaking of the rotor and decrease a gap between the magnetized portion 1a and a stator 4, referred to hereinafter, to thereby ensure sufficient output torque. Moreover, the injection molding of the magnet provides a thin resin film formed on the surfaces of the magnet, so that the amount of rust generated on the injection molded magnet is far smaller than that generated on a compression molded magnet, which makes it possible to omit rustproof treatment such as coating. In addition, the injection molded magnet is free of adherence of magnetic powder or surface swelling which is apt to occur during rustproof treatment, which is inherent in a compression molded magnet, leading to improved product quality.

The plastic magnet used as the magnet 1 is formed by injection molding a mixture of Nd—Fe—B -based rare earth magnetic powder and a thermoplastic resin binder such as polyamide. While a magnet formed by compression molding has a bending strength of about 500 Kgf/cm$^2$, the use of polyamide resin as the binder material, for example, can obtain a bending strength of not less than 800 Kgf/cm$^2$, and as a result, the magnet 1 can be formed into a thin-wall hollow cylindrical shape, which could not be achieved by compression molding. The thin-wall hollow cylindrical shape of the magnet 1 thus formed enables a reduction in the gap or distance between an outer magnetic pole and an inner magnetic pole of the stator 4, described hereinbelow, thereby making it possible to form a magnetic circuit having a small magnetic resistance therebetween. Thus, when a coil 2, referred to hereinafter, is energized, an increased amount of magnetic flux can be generated with a small magnetomotive force, which enhances the performance of the actuator.

The coil 2, which is in the form of a hollow cylinder, is wound on a bobbin 3 formed of an insulating material. The coil 2 is arranged to be concentric and axially parallel with the magnet 1. The outer diameter of the coil 2 is approximately equal to that of the magnet 1.

The stator 4 is formed of a soft magnetic material and comprised of an outer hollow cylinder (outer magnetic pole), an inner hollow cylinder (inner magnetic pole) and a connecting portion 4c connecting the hollow cylinders. The outer hollow cylinder of the stator 4 is formed at one end thereof with a plurality of teeth each extending in the axial direction, i.e., presenting a hair comb shape. The number of the axially extending teeth is half the number n of the sections of the magnetized portion 1a of the magnet 1 (i.e., eight in the present embodiment). These teeth form outer magnetic pole pieces 4a. The outer magnetic pole pieces 4a are arranged circumferentially at equal intervals of 720/n degrees (45 degrees in the present embodiment). On the other hand, the inner hollow cylinder of the stator 4 forms the inner magnetic pole portion 4b. If the outer magnetic pole pieces 4a were formed by teeth extending radially, the diameter of the actuator would be increased by the radial length of the magnetic pole pieces 4a. However, in the present embodiment, the comb teeth-shaped portions extending in the axial direction form the outer magnetic pole pieces 4a, which contributes to minimization of the diameter of the actuator.

Although in the present embodiment, the number of the outer magnetic pole pieces 4a (number of the teeth) of the stator 4 is set to half the number n of the sections of the magnetized portion 1a of the magnet 1, this is just an ideal number, and hence even if the teeth are reduced in number, e.g., by one, it offers no problem to the operation of the actuator though there might be a slight decrease in the output thereof. Even in this case, however, the remaining teeth are required to be arranged circumferentially at intervals of 720/n degrees. The space formed by thinning the number of the teeth may be made use of by another member.

Further, although in the present embodiment, the inner magnetic pole portion 4b of the stator 4 is in the form of a simple hollow cylinder, it may be also be formed to have a hair comb-like shape similar to the outer magnetic pole piece 4a.

The coil 2 and the bobbin 3 are fixedly fitted between the outer magnetic pole pieces 4a and inner magnetic pole portion 4b of the stator 4, e.g., by bonding. When the coil 2 is energized, the stator 4 is magnetized.

The outer magnetic pole pieces 4a and inner magnetic pole portion 4b of the stator 4 are designed to sandwich the magnetized portion 1a of the magnet 1 with predetermined clearances such that they are opposed to the respective outer and inner peripheral surfaces of the magnetized portion 1a. Accordingly, the magnetic flux generated by the outer magnetic pole pieces 4a and the inner magnetic pole member 4b which are magnetized by the coil 2 crosses the magnet 1 at a location between the outer magnetic pole pieces 4a and the inner magnetic pole portion 4b to effectively act on the magnet 1 as the rotor, thereby enhancing the output of the actuator.

As described above, the magnet 1, the coil 2, the bobbin 3 and the stator 4 constitute the actuator of the light amount controller according to the present embodiment.

Reference numeral 5 designates the base board having a central portion thereof formed therein with an opening 5b. The magnet 1 is rotatably mounted to the base board 5 by engagement between the engaging portion 1e of the magnet 1 and the engaging portion 5e of the base board 5, and a magnet stopper 6 is fixed to the base board 5 via the engaging portion 1e of the magnet 1, e.g., by bonding, whereby the magnet 1 is prevented from axially falling off. It should be noted that although in the present embodiment, the magnet stopper 6 is used for preventing the magnet 1 from axially falling off, a stopper portion may be formed integrally on the base board 5.

The base board 5 has another engaging portion 5a having the outer magnetic pole pieces 4a of the stator 4 engaged therewith and fixed thereto, e.g., by bonding. In this case, the stator 4 is fixed to the base board such that it is coaxial with the magnet 1, with a predetermined clearance maintained in the axial direction between a top end, as viewed in FIG. 1, of the magnetized portion 1a of the magnet 1 and the bobbin 3 fixedly fitted in the stator 4. Although in the present embodiment, the stator 4 is mounted to the base board 5 by engagement between the outer magnetic pole pieces 4a and the engaging portion 5a of the base board 5 (outer-diameter engagement), the inner magnetic pole member 4b may be engaged with the base board 5 (inner-diameter engagement).

Further, the base board 5 is formed integrally with dowels 5c and 5d projecting in the same direction as the dowels 1c and 1d of the magnet 1. The base board 5 is further formed with stopper portions 5f and 5g for limiting rotation of the magnet 1 such that the projection 1b of the magnet 1 is brought into abutment with the stopper portions 5f and 5g. That is, the magnet 1 is allowed to rotate between a position where the projection 1b is brought into abutment with the stopper portion 5f and a position where the projection 1b is brought into abutment with the stopper portion 5g.

Reference numerals 7 and 8 designate blades. The blade 7 is formed therein with a round hole 7a for the blade 7 to rotatably engage the dowel 5c of the base board 5 and an elongate hole 7b for the blade 7 to slidably engage the dowel 1c of the magnet 1, while the blade 8 is formed therein with a round hole 8a for the blade 8 to rotatably engage the dowel 5d of the base board 5 and an elongate hole 8b for the blade 8 to slidably engage the dowel 1d of the magnet 1.

Reference numeral 9 designates a blade retainer having a central portion thereof formed therein with an opening 9a. The blade retainer 9 is secured to the base board 5 with the blades 7 and 8 interposed therebetween through predetermined clearances. The blade retainer 9 serves to bear the blades 7 and 8 in the axial direction.

Rotation of the magnet 1 causes rotation of the blade 7 about the round hole 7a through the elongate hole 7b being pushed by the dowel 1c of the magnet 1, and rotation of the blade 8 about the round hole 8a through the elongate hole 8b being pushed by the dowel 1d of the magnet 1, whereby the amount of light passing through the opening 5b of the base board 5 is controlled.

As described above, the magnet 1, the coil 2, the bobbin 3, the stator 4, the base board 5, the magnet stopper 6, the blades 7 and 8, and the blade retainer 9 constitute the light amount controller of the present embodiment.

FIGS. 3A to 3C are views taken on line A—A of FIG. 2, which are useful in explaining the rotating operation of the magnet of the driving device according to the present invention. FIG. 3A shows a state in which the magnet 1 is in stoppage due to a cogging force when the coil 2 is deenergized, FIG. 3B shows a state in which the projection 1b of the magnet 1 is in abutment with the stopper portion 5f of the base board 5 when the coil 2 is normally energized, and FIG. 3C shows a state in which the projection 1b of the magnet 1 is in abutment with the stopper portion 5g of the base board 5 when the coil 2 is reversely energized. The rotating operation of the magnet 1 will be described with reference to FIGS. 3A to 3C as well as FIGS. 4 and 5.

Figure 4:
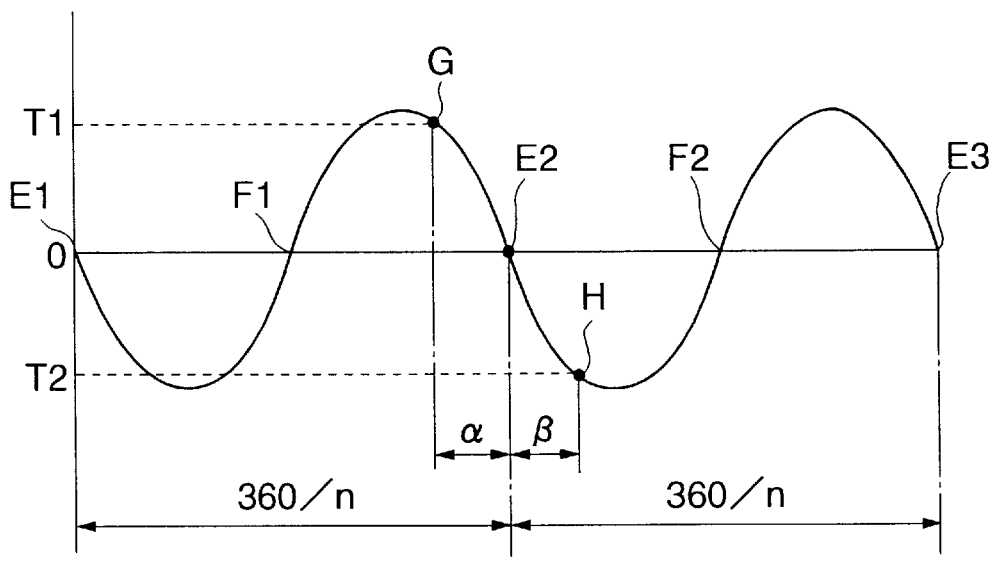
FIG. 4 is a graph showing changes in cogging torque.

FIG. 4 is a graph showing changes in cogging torque (attractive force generated between the magnet 1 and the stator 4 and acting on the magnet 1). The figure shows how the magnet 1 is attracted by the outer magnetic pole pieces 4a according to the rotational position of the magnet 1 when the coil 2 is not energized.

In FIG. 4, the ordinate represents the strength of the magnetic force generated between the magnet 1 and the stator 4 and acting on the magnet 1, while the abscissa represents the rotational phase of the magnet 1. At each of positions designated by points E1, E2, and E3 when the magnet 1 is about to normally rotate, a reverse rotational force acts on the magnet 1 to return the same to the original position, whereas when the magnet 1 is about to reversely rotate, a normal rotational force acts on the magnet 1 to return the same to the original position. In short, the points E1, E2, and E3 represent the cogged positions at which the magnetic force generated between the magnet 1 and the stator 4 acts on the magnet 1 to stably position the same. On the other hand, points F1 and F2 represent stop positions where the magnet 1 is in an unstable equilibrium state in which even a least phase shift of the magnet 1 causes a force to act on the magnet 1 to rotate the same toward the point E1, E2 or E3. When the coil 2 is not energized, the magnet 1 is always held in stoppage at the point E1, E2 or E3 without staying at the point F1 or F2 due to a vibration or a change in attitude of the light amount controller.

Assuming that the magnet 1 has n magnetized poles (n sections of the magnetized portion 1a), stable cogged points, such as the points E1, E2, and E3, exist at intervals of 360/n degrees, and an intermediate position between adjacent ones of the stable cogged points is an unstable point, such as the point F1 or F2.

A numerical simulation by the finite element method has proved that the attractive state between the outer magnetic pole pieces 4a and the magnet 1 during deenergization of the coil changes depending on the relationship between the angle corresponding to a circumferential width of each magnetized pole of the magnet 1 about the rotational axis thereof and the angle corresponding to a circumferential width of each outer magnetic pole piece 4a opposed to the magnet 1 about the rotational axis of the magnet 1. According to the numerical simulation, the cogged position of the magnet 1 changes depending on the angle corresponding to the circumferential width of the outer magnetic pole piece 4a opposed to the magnet 1 about the rotational axis of the magnet 1 (hereinafter referred to as "the opposition angle of the outer magnetic pole piece 4a"). More specifically, on condition that the angle corresponding to the circumferential width of each magnetized pole of the magnet 1 about the rotational angle thereof (hereinafter referred to as "the magnet pole angle") is fixed, when the opposition angle of the outer magnetic pole piece 4a is smaller than a predetermined value, the magnet 1 is stably held at a position where the center of the magnetized pole of the magnet 1 is opposed to the center of the outer magnetic pole piece 4a. On this occasion, the point E1, E2 or E3 described above with reference to FIG. 4 corresponds to the position where the center of the magnetized pole of the magnet 1 is opposed to the center of the outer magnetic pole piece 4a. On the other hand, when the opposition angle of the outer magnetic pole piece 4a is equal to or larger than the predetermined value, the magnet 1 is stably held at a position where the boundary between two poles of the magnet 1 is opposed to the center of the outer magnetic pole piece 4a. On this occasion, the point E1, E2 or E3 corresponds to the position where the boundary between two poles of the magnet 1 is opposed to the center of the outer magnetic pole piece 4a. How the magnet is thus stably held will be explained in more detail with reference to FIG. 5.

Figure 5:
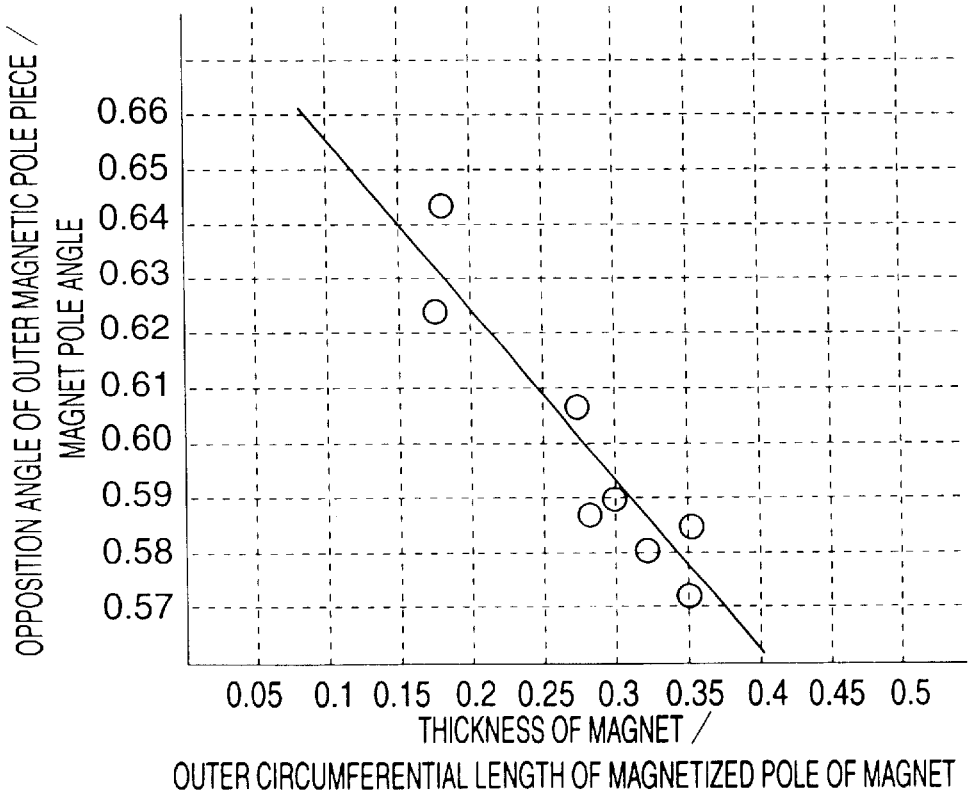
FIG. 5 is a graph showing the relationship between the width dimension of each outer magnetic pole piece 4a appearing in FIG. 1, cogging torque and the dimensions of the magnet.

FIG. 5 is a graph showing how the width dimension of each outer magnetic pole piece 4a, cogging torque, and the dimensions of the magnet 1 are related to each other.

In FIG. 5, the abscissa represents the ratio of the thickness of the magnet 1 to the outer circumferential length of each magnetized pole of the magnet 1, while the ordinate represents the ratio of the opposition angle of the outer magnetic pole piece 4a to the magnet pole angle.

For instance, assuming that the magnet 1 has an outer diameter of 10 mm, an inner diameter of 9 mm, and 16 poles, since the thickness of the magnet 1 is (10-9)/2 mm, and the outer circumferential length of each pole is $10 \times \pi/16$ mm, the ratio of the thickness of the magnet 1 to the outer circumferential length of each magnetized pole of the magnet 1 shown on the abscissa is 0.255. Further, assuming that the opposition angle of the outer magnetic pole piece 4a is 15 degrees, since the magnet pole angle is 22.5 degrees, the ratio of the opposition angle of the outer magnetic pole piece 4a to the magnet pole angle shown on the ordinate is 0.667.

Points plotted in FIG. 5 represent values of the ratio of the opposition angle of the outer magnetic pole piece 4a to the magnet pole angle in relation to the ratio of the thickness of the magnet 1 to the circumferential length of each magnetized pole of the magnet 1, which values are assumed by respective models having cogging torque of approximately zero. When the value on the ordinate is designated by Y and the value on the abscissa by X, the points can be approximated by the following equation representative of a straight line: $Y = -0.327X + 0.69$. If $Y < -0.327X + 0.69$ holds, the center of the magnetized pole of the magnet 1 is stably held at a position opposed to the center of the corresponding outer magnetic pole piece 4a, whereas if $Y > -0.327X + 0.69$ holds, the boundary between magnetized poles of the magnet 1 is stably held at a position opposed to the center of the corresponding outer magnetic pole piece 4a.

More specifically, $Y < -0.327X + 0.69$ can be transformed as follows: Assuming that the opposition angle of the outer magnetic pole piece 4a is A degrees, and the magnet 1 has n magnetized poles, an outer diameter of D1 and an inner diameter of D2, $Y < -0.327X + 0.69$ can be transformed into $A > (248.4/n) - 58.86 \times (D1-D2)/(D1 \times \pi)$. This means that insomuch as $A > (248.4/n) - 58.86 \times (D1-D2)/(D1 \times \pi)$ holds, the center of the magnetized pole of the magnet 1 is stably held at a position opposed to the center of the corresponding outer magnetic pole piece 4a.

In the present embodiment, since it is assumed that the number n of the magnetized poles of the magnet 1 is 16, the outer diameter D1 of the magnet 1 is 10 mm, and the inner diameter D2 of the same 9 mm, $(248.4/n) - 58.86 \times (D1-D2)/(D1 \times \pi) = 13.65$ (degrees) holds. Therefore, if the opposition angle A (degrees) of the outer magnetic pole piece 4a is below 13.65 degrees, the condition of $Y > -0.327X + 0.69$ is satisfied. In the present embodiment, since the opposition angle A (degrees) of the outer magnetic pole piece 4a is set to 15 degrees, the boundary between magnetized poles of the magnet 1 can be stably held at a position opposed to the center of the corresponding outer magnetic pole piece 4a.

It is desirable that the opposition angle A (degrees) of the outer magnetic pole piece 4a should be set in consideration of parts dimension tolerances, engagement looseness, and the like. In the above case, for example, if the opposition angle A (degrees) of the outer magnetic pole piece 4a is set to 13.7 degrees, the boundary between magnetized poles of the magnet 1 opposed to the corresponding outer magnetic pole piece 4a can theoretically be stably held at a position opposed to the center of the corresponding outer magnetic pole piece 4a. However, if possible parts dimension tolerances, engagement looseness, and the like are taken into account, it can hardly be guaranteed that the boundary between magnetized poles of the magnet 1 can always be stably held at the position opposed to the center of the corresponding outer magnetic pole piece 4a. To eliminate this inconvenience, it is necessary to set the opposition angle A (degrees) to a slightly smaller value than required, but if the opposition angle A (degrees) is too much reduced, cogging force is likely to excessively increase, thereby causing reduced torque. Therefore, it is required to set the opposition angle A (degrees) in view of a balance point between the cogging force and required torque.

When the coil is energized to magnetize the outer magnetic pole pieces 4a in a state of the boundary between adjacent ones of the magnetized poles of the magnet 1 being opposed to the center of the corresponding outer magnetic pole piece 4a, a rotational force is always generated in the magnet 1 to start the actuator. On the other hand, when the coil is energized to magnetize the outer magnetic pole pieces 4a in a state of the center of each magnetized pole of the magnet 1 being opposed to the center of the corresponding outer magnetic pole piece 4a, no rotational force is generated in the magnet 1.

Next, rotating operation of the magnet 1 will be described with reference to FIGS. 3A to 3C and FIG. 4.

In the present embodiment, assuming that the opposition angle of the outer magnetic pole piece 4a is represented by A (degrees), the dimension of the outer diameter of the magnet 1 by D1, and the dimension of the inner diameter of the magnet 1 by D2, these values are set such that the condition of $A>(248.4/n)-58.86\times(D1-D2)/(D1\times\pi)$ is satisfied. In this case, the range of the value A corresponds to a region on the right upper side of the straight line plotted in the FIG. 5 graph. When the coil 2 is not energized, the points E1, E2 and E3 in FIG. 4 described above each correspond to a position where the boundary between associated magnetized poles of the magnet 1 is opposed to the center of the corresponding outer magnetic pole piece 4a, and hence the magnet 1 is stably held at the position due to cogging torque. If the coil 2 is energized in this state to magnetize the outer magnetic pole pieces 4a, a rotational force is generated in the magnet 1 to smoothly start the actuator.

Thus, when the coil 2 is not energized as in FIG. 3A, the magnet 1 is stably held at the position where the boundary between magnetized poles of the magnet 1 is opposed to the center of the outer magnetic pole piece 4a. This state corresponds to the point E2 in FIG. 4.

When the coil 2 is energized in the FIG. 3A state to magnetize the outer magnetic pole pieces 4a and inner magnetic pole portion 4b of the stator 4 as N poles and S pole, respectively, the magnetization of the outer magnetic pole pieces 4a and the inner magnetic pole portion 4b causes a magnetic force to act on the magnet 1 as the rotor in a direction of normal rotation, whereby the magnet 1 as the rotor starts counterclockwise rotation smoothly. Then, when the projection 1b of the magnet 1 comes into abutment with the stopper portion 5f of the base board 5 that limits the rotation of the magnet 1, as shown in FIG. 3B, the magnet 1 is stopped from rotating. It is set such that at this position, the angle formed about the rotational axis 1f of the magnet 1 between the boundary between associated magnetized poles of the magnet 1 and the center of the corresponding outer magnetic pole piece 4a assumes α degrees. In other words, the magnet 1 has rotated through α degrees from the FIG. 3A state. This state corresponds to a point G in FIG. 4. Cogging torque acting on the magnet 1 at this position is T1. The cogging torque acts as a normal rotational force (a force acting in a clockwise direction as viewed in FIG. 3B) to normally rotate the magnet toward the point E2. Thus, when the coil 2 is deenergized in the FIG. 3B state, the magnet 1 rotates in the clockwise direction through α degrees into the FIG. 3A state that corresponds to the point E2, and then stops.

On the other hand, when the coil 2 is reversely energized in the FIG. 3a state to magnetize the outer magnetic pole pieces 4a and inner magnetic pole portion 4b of the stator 4 as S poles and N pole, respectively, the magnetization of the outer magnetic pole pieces 4a and the inner magnetic pole portion 4b causes a magnetic force to act on the magnet 1 in a direction of reverse rotation, whereby the magnet 1 as the rotor starts clockwise rotation smoothly. Then, when the projection 1b of the magnet 1 comes into abutment with the stopper portion 5g of the base board 5 that limits the rotation of the magnet 1, as shown in FIG. 3C, the magnet 1 is stopped from rotating. It is set such that at this position, the angle formed about the rotational axis if of the magnet 1 between the boundary between associated magnetized poles of the magnet 1 and the center of the corresponding outer magnetic pole piece 4a assumes β degrees. In other words, the magnet 1 has rotated through β degrees from the FIG. 3A state. This state corresponds to a point H in FIG. 4. Cogging torque acting on the magnet 1 at this position is T2. The cogging torque acts as a reverse rotational force (a force acting in a counterclockwise direction as viewed in FIG. 3A) to reversely rotate the magnet 1 back toward the point E2. Thus, when the coil 2 is deenergized in the FIG. 3C state, the magnet 1 rotates in the counterclockwise direction through β degrees into the FIG. 3A state that corresponds to the point E2, and then stops.

As described above, by switching the direction of energizing the coil 2, the state of the magnet 1 as the rotor is switched between one shown in FIG. 3B and one shown in FIG. 3C. Deenergization of the coil 2 in either state causes the magnet 1 to shift into the FIG. 3A state, where the magnet 1 is stably held at the position due to the cogging force. The magnet 1 is allowed to rotate so long as the rotational ranges α and β of the magnet 1 are each set within a range which does not reach either of the points F1 and F2, but still in setting the rotational range of the magnet 1, it is necessary to consider the balance point between the cogging force and the required torque as well as the required amount of rotation. The points F1 and F2 are positions corresponding to the respective centers of an S pole and an N pole adjacent to each other of the magnet 1.

As described hereinbefore, the blades 7 and 8 rotate in a manner interlocked with the rotation of the magnet 1. When the magnet 1 is in the FIG. 3A state, the blades 7 and 8 are each held in a position for reducing the area of the opening 5b of the base board 5 by a predetermined amount. On the other hand, when the magnet 1 is in the FIG. 3B state, the opening 5b of the base board 5 is closed by the blades 7 and 8. Accordingly, by switching the state and direction of energization of the coil 2, it is possible to shift the position of the blades 7 and 8 between a closing position, an intermediate position, and an opening position, thereby controlling the amount of light passing through the opening 5b of the base board 5. Further, when the coil 2 is not energized, the blades 7 and 8 are held at respective positions corresponding to the intermediate position by the attractive force between the magnet 1 and the outer magnetic pole pieces 4a.

Thus, the light amount controller can function as a shutter device which is capable of switching between an open state, an intermediate aperture state, and a closed state.

Next, a light amount controller according to a second embodiment of the present invention will be described in detail with reference to FIGS. 6 to 8c.

Figure 6:
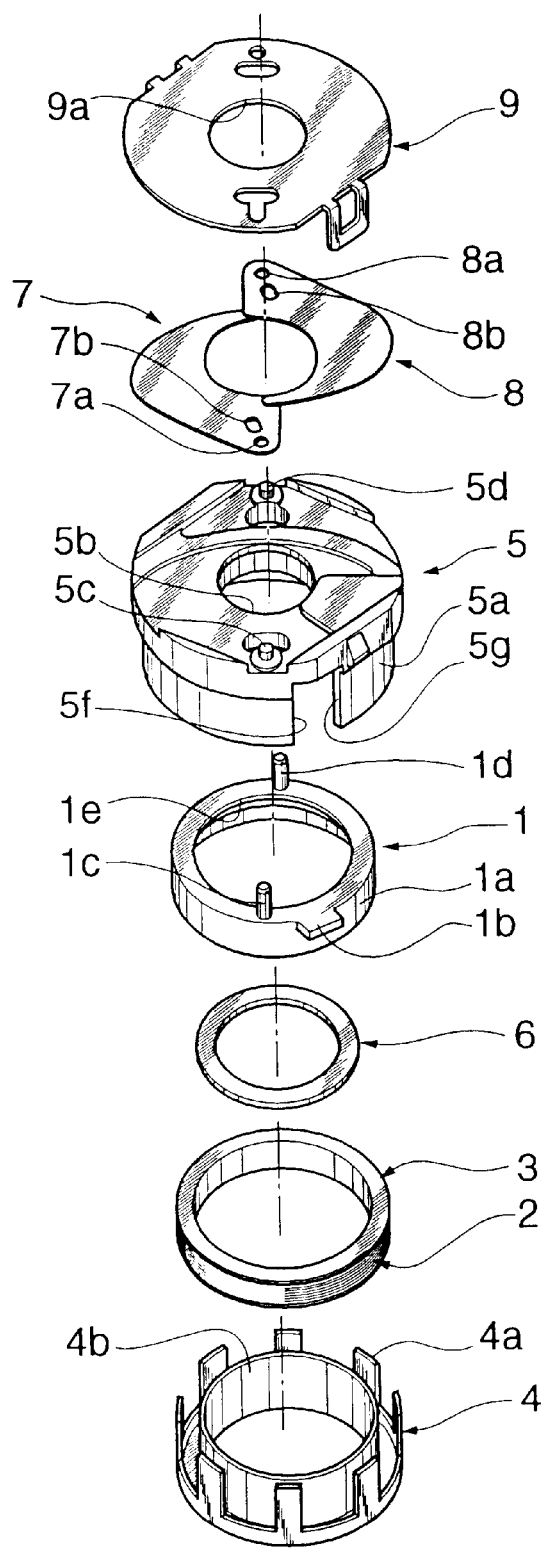
FIG. 6 is an exploded perspective view of a light amount controller equipped with a driving device according to a second embodiment.
Figure 7:
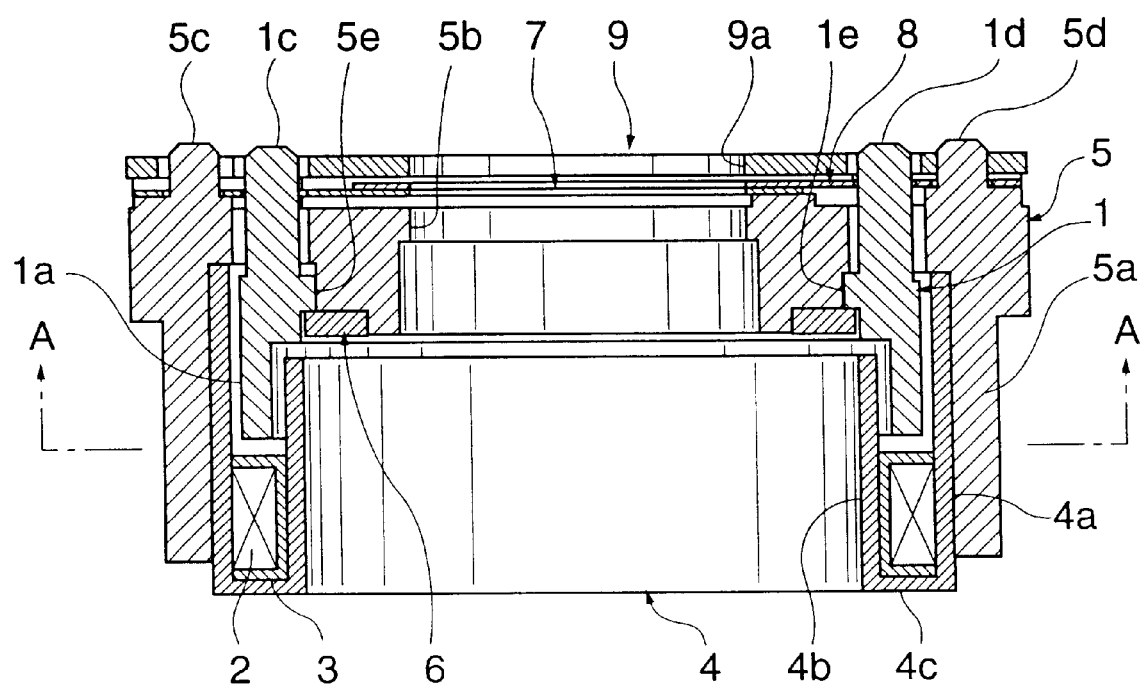
FIG. 7 is an axial cross-sectional view of an assembled state of the light amount controller equipped with the driving device shown in FIG. 6.
Figure 8A:
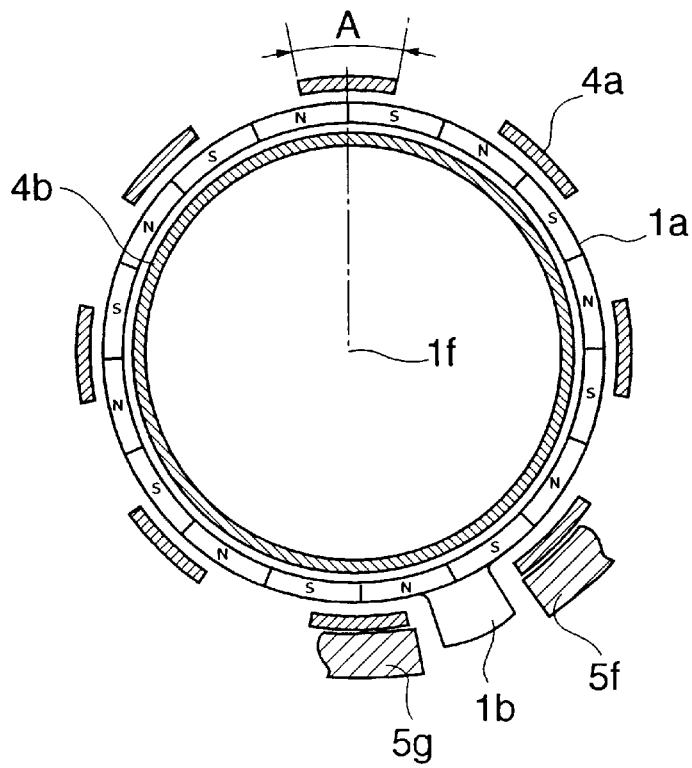
FIG. 8A is a transverse cross-sectional view showing a state in which a magnet 1 appearing in FIG. 6 is in stoppage due to a cogging force when a coil 2 is deenergized.
Figure 8B:
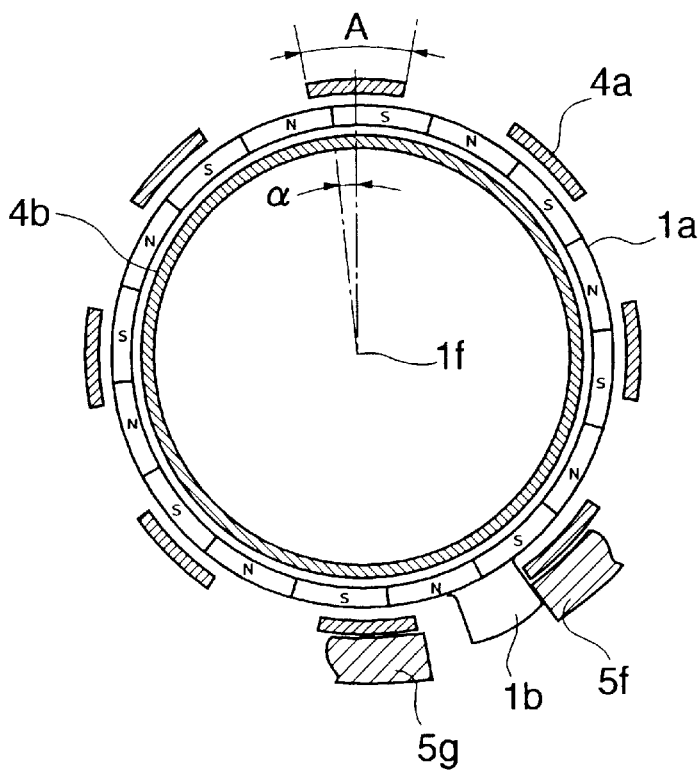
FIG. 8B is a transverse cross-sectional view showing a state in which a projection 1b of the magnet 1 appearing in FIG. 6 is in abutment with a stopper portion 5f of a base board 5 when the coil 2 is normally energized.
Figure 8C:
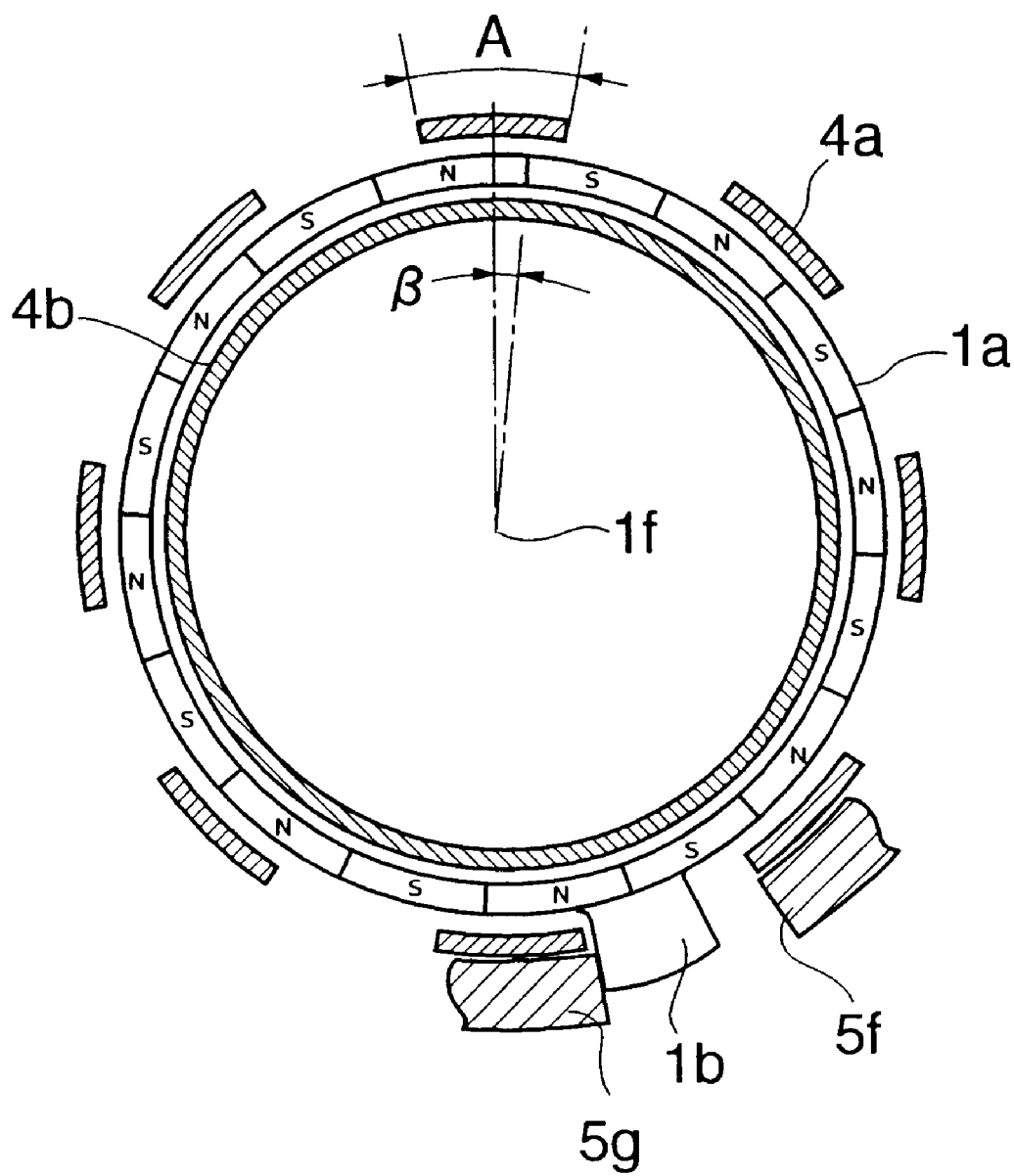
FIG. 8C is a transverse cross-sectional view showing a state in which the projection 1b of the magnet 1 appearing in FIG. 6 is in abutment with a stopper portion 5g of the base board 5 when the coil 2 is reversely energized.
Figure 9:
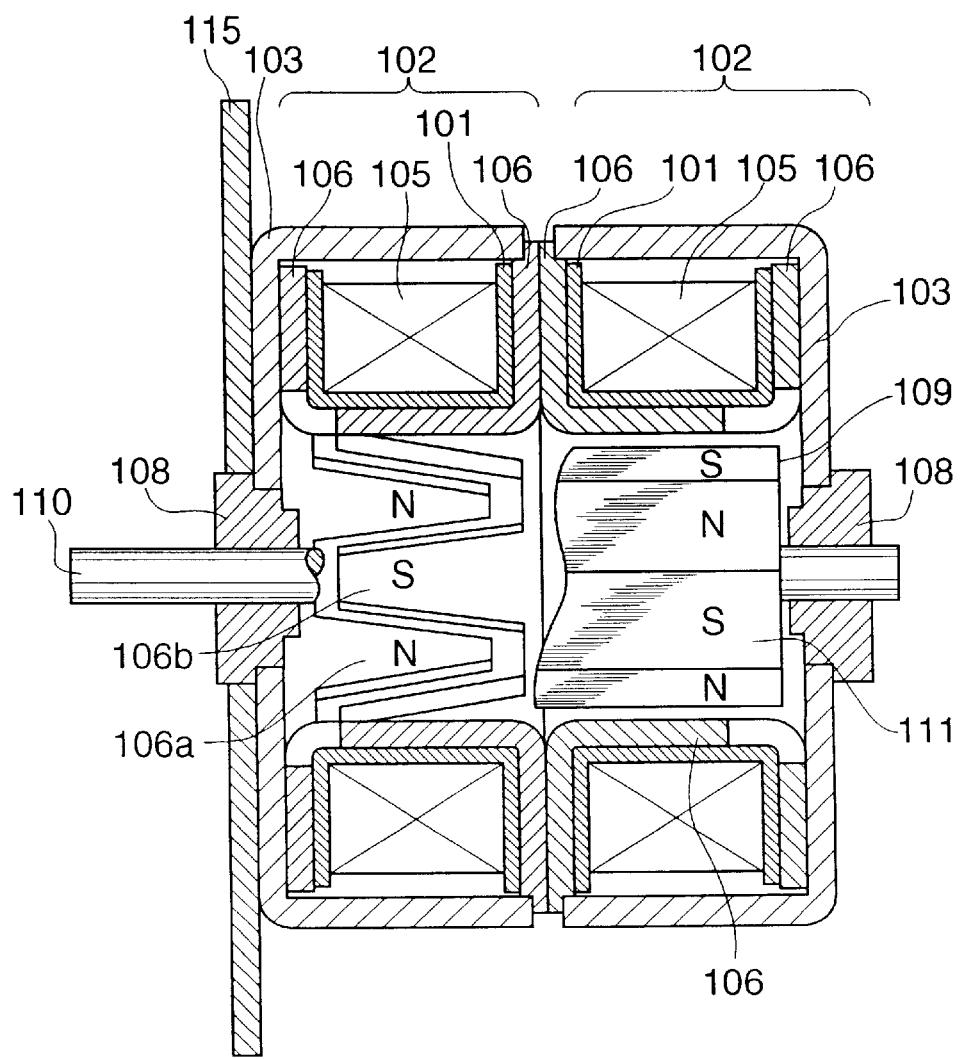
FIG. 9 is a cross-sectional view of a conventional stepper motor.
Figure 10:
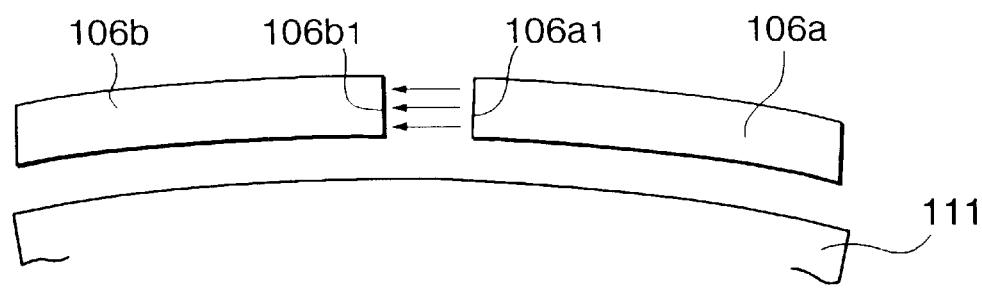
FIG. 10 is a cross-sectional view of a stator of the conventional stepper motor.
Figure 11:
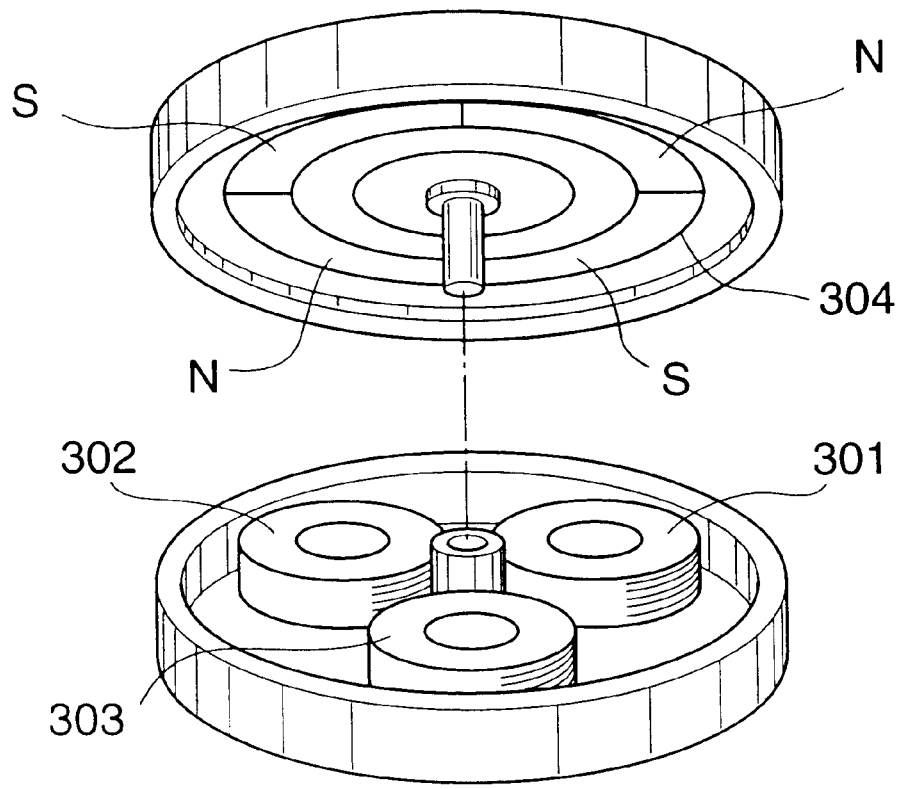
FIG. 11 is a perspective view of a conventional brushless motor.
Figure 12:
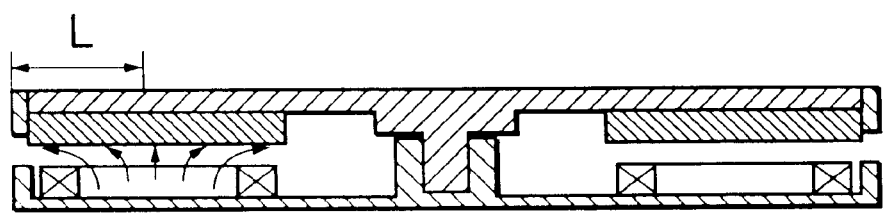
FIG. 12 is a cross-sectional view of the conventional brushless motor.

FIGS. 6 to 8c show the light amount controller according to the second embodiment. FIG. 6 is an exploded perspective view of the light amount controller equipped with a driving device according to the second embodiment. FIG. 7 is an axial cross-sectional view of an assembled state of the light amount controller equipped with the driving device shown in FIG. 6, while FIGS. 8A to 8c are views useful in explaining rotating operations of a magnet of the driving device. In these figures, component elements and parts corresponding to those in the first embodiment are designated by identical reference numerals.

The light amount controller of the second embodiment is identical in construction to the light amount controller of the first embodiment, except for the construction of a stator 4 thereof, described hereafter.

The stator 4 is configured such that the inner magnetic pole portion 4b of the stator 4 has an axial length set such that the top end of the portion 4b is located below the top end of the inner peripheral surface of the magnetized portion 1a of the magnet 1, because the engaging portion 1e and the magnet stopper 6 are provided inside the magnet 1. Consequently, the inner magnetic pole portion 4b generates a force which axially pulls the magnet 1 (downward as viewed in FIG. 7). In view of the generation of the force axially pulling the magnet 1, it is preferred that each outer magnetic pole piece 4a (each tooth of the hair comb shape) has an axial length substantially larger than that of the outer peripheral surface of the magnetized portion 1a of the magnet 1 (see FIG. 7). This construction causes the outer magnetic pole pieces 4a to develop an attractive force axially pulling the magnet 1 upward as viewed in FIG. 7, which reduces the force of the inner magnetic pole portion 4b axially acting on the magnet 1 (i.e., attractive force acting downward as viewed in FIG. 7). As a result, sliding friction between the magnet 1 and the magnet stopper 6 axially holding the magnet 1 is reduced, which ensures smooth rotation of the magnet 1.

To avoid interference with the outer magnetic pole pieces 4a, the projection 1b in the present embodiment is arranged in an offset position from the position of the projection 1b in the first embodiment, and correspondingly to this, the stoppers 5f and 5g in the present embodiment are also arranged in offset positions from the respective positions of the stoppers 5f and 5g in the first embodiment. The rotating operations of the magnet 1 are the same as described in the first embodiment.

Although in each of the above first and second embodiments, the light amount controller has two blades which can be opened and closed, the controller may be provided with a single blade or triple or more blades.

Further, although the light amount controller is applied to a shutter device capable of switching the state of the blades between the opened state, the intermediate aperture state, and the closed state, the light amount controller may be applied to a variable diaphragm device, e.g., for switching the state of the blades between an opened state, an intermediate aperture state, and a small aperture state. Further, the light amount controller may be applied to a filter changeover device for an ND filter or the like, or a density switching device.

Moreover, although in the above embodiments, the magnet is divided into 16 magnetized sections, the number of the magnetized sections is not limited to 16, and any even number may be applied as the number of the magnetized sections.

As described above, according to the above embodiments, the outer diameter of the driving device is determined by the outer magnetic pole pieces opposed to the outer peripheral surface of the magnet, the inner diameter of the driving device is determined by the inner magnetic pole portion opposed to the inner peripheral surface of the magnet, and the axial size or height of the driving device is determined by the axial arrangement of the coil and the magnet. As a result, by employing the magnet and the coil which are reduced in diameter and height, it is possible to design the driving device that is more compact in size.

Further, the magnetic flux generated between the outer magnetic pole pieces and the inner magnetic pole portion magnetized by excitation of the coil crosses the magnet arranged between the magnetic pole pieces and member, and hence effectively acts on the magnet.

Moreover, since the outer magnetic pole pieces are in the form of teeth of a hair comb which axially extend, it is possible to reduce the radial dimension of the driving device.

Further, since a single coil is used, a control circuit for energization thereof can be simplified, which contributes to reduction of manufacturing costs.

Furthermore, assuming that the angle corresponding to the angle through which each tooth of the hair comb shape of the outer magnetic piece opposed to the outer peripheral surface of the magnet circumferentially extends about the rotational axis thereof is A degrees, and the magnet has n magnetized poles, an outer diameter of D1 and an inner diameter of D2, these values are set such that the condition of $A > (248.4/n) - 58.86 \times (D1-D2)/(D1 \times \pi)$ is satisfied. Therefore, when the coil is not energized, the boundary between magnetized poles of the magnet can be stably held at a position opposed to the center of a corresponding one of the hair comb tooth-shaped outer magnetic pole pieces.

Since each hair comb tooth-shaped magnetic pole piece is configured to have an axial length larger than the height of the outer peripheral surface of the magnet, a force axially exerted on the magnet by the outer magnetic pole pieces and the inner magnetic pole portion is reduced. As a result, sliding friction between the magnet and the members holding the magnet in the axial direction is reduced, which enables smooth rotation of the magnet.

Moreover, since the light amount controller includes the above driving device and the light amount control member which turns in a state linked to the magnet of the driving device to thereby control the amount of light passing through the inside of the hollow cylindrical inner magnetic pole portion, it is possible to allow light to pass through the central portion of the driving device. Further, it is also possible to construct a shutter provided with shutter blades operated in a manner interlocked with rotation of the magnet.

Further, it is possible to switch the light amount-controlled state between three different light amount-controlled states by changing the state and direction of energization of the coil.

What is claimed is:

1. A driving device comprising:
   a rotor having a cylindrical shape and having an outer peripheral surface and an inner peripheral surface, at least the outer peripheral surface being circumferentially divided into a plurality of sections magnetized so as to have alternately different poles;
   a coil arranged with an axis parallel to an axis of said rotor;
   at least one outer magnetic pole portion disposed to be magnetized by said coil, said outer magnetic pole portion formed so as to extend along the axis of said rotor, opposed to said rotor and arranged around said rotor such that an angle corresponding to a circumferential width of said outer magnetic pole portion opposed to said rotor about the rotational axis of said rotor is equal to a predetermined angle A; and an inner magnetic pole portion disposed to be magnetized by said coil, said inner magnetic pole portion having a cylindrical shape opposed to the inner peripheral surface of said rotor, wherein the predetermined angle A is set to such a value that a rotational force acts on said rotor to return to a position in which a boundary between adjacent ones of the plurality of sections having alternately different poles is opposed to a circumferential center of said outer magnetic pole portion when the boundary shifts from the position.

2. A driving device according to claim 1, wherein when the outer peripheral surface of said rotor is circumferentially divided into n sections and has an outer diameter of D1 and an inner diameter of D2, the predetermined angle A is set to satisfy a condition defined by an expression:

$$A > (248.4/n) - 58.86 \times (D1-D2)/(D1 \times \pi).$$

3. A driving device according to claim 1, wherein said outer magnetic pole portion has an axial length larger than a height of the outer peripheral surface of said rotor.

4. A driving device according to claim 1, including a rotation-preventing member for limiting a rotational angle of said rotor.

5. A driving device according to claim 1, wherein said rotor is rotatable through a rotational angle range smaller than an angle corresponding to a circumferential length of each of the plurality of sections having alternately different poles about the rotational axis of the cylindrical shape of said rotor.

6. A light amount controller comprising:

a rotor having a cylindrical shape and having an outer peripheral surface and an inner peripheral surface, at least the outer peripheral surface being circumferentially divided into a plurality of sections magnetized so as to have alternately different poles;

a coil arranged with an axis parallel to an axis of said rotor and parallel thereto;

at least one outer magnetic pole portion disposed to be magnetized by said coil, said outer magnetic pole portion formed so as to extend along the axis of said rotor, opposed to said rotor and arranged around said rotor such that an angle corresponding to a circumferential width of said outer magnetic pole opposed to said rotor about the rotational axis of said rotor is equal to a predetermined angle A;

an inner magnetic pole portion disposed to be magnetized by said coil, said inner magnetic pole portion having a hollow cylindrical shape opposed to the inner peripheral surface of said rotor; and a light amount control member disposed for rotation and interlocked to said rotor;

wherein the predetermined angle A is set to such a value that a rotational force acts on said rotor to return to a position in which a boundary between adjacent ones of the plurality of sections having alternately different poles is opposed to a circumferential center of said outer magnetic pole, portion when the boundary shifts from the position.

7. A light amount controller according to claim 6, wherein when the outer peripheral surface of said rotor is circumferentially divided into n sections and has an outer diameter of D1 and an inner diameter of D2, the predetermined angle A is set to satisfy a condition defined by an expression:

$$A > (248.4/n) - 58.86 \times (D1-D2)/(D1 \times \pi).$$

8. A light amount controller according to claim 6, wherein said outer magnetic pole portion has an axial length larger than a height of the outer peripheral surface of said rotor, said light amount control member being openable and closable in a manner interlocked to said rotor to thereby control an amount of light passing through said inner magnetic pole portion.

9. A light amount controller according to claim 6, including a rotation-preventing member for limiting a rotational angle of said rotor.

10. A light amount controller according to claim 6, wherein said rotor is rotatable through a rotational angle range smaller than an angle corresponding to a circumferential length of each of the plurality of sections having alternately different poles about the rotational axis of the cylindrical shape of said rotor.

11. A light amount controller comprising:

a rotor having a cylindrical shape and having an outer peripheral surface and an inner peripheral surface, at least the outer peripheral surface being circumferentially divided into a plurality of sections magnetized so as to have alternately different poles, a coil arranged with an axis parallel to an axis of said rotor;

at least one outer magnetic pole portion disposed to be magnetized by said coil, said outer magnetic pole portion formed so as to extend along the axis of said rotor, opposed to said rotor and arranged around said rotor such that an angle corresponding to a circumferential width of said outer magnetic pole portion opposed to said rotor about the rotational axis of said rotor is equal to a predetermined angle A;

an inner magnetic pole portion disposed to be magnetized by said coil, said inner magnetic pole portion having a cylindrical shape opposed to the inner peripheral surface of said rotor;

a light amount control member being openable and closable in a manner interlocked to said rotor to thereby control an amount of light passing through said inner magnetic pole portion; and a control circuit that controls said light amount control member by selectively switching between a first state in which said rotor magnet is held at a first predetermined rotational position by attractive forces of said rotor and said outer magnetic pole portion when said coil is deenergized, a second state in which said rotor is rotated from said first state in a normal direction to a second predetermined rotational position by normal energization of said coil, and a third state in which said rotor is rotated from said first state in a direction opposite to the normal direction to a third predetermined rotational position by reverse energization of said coil, wherein the predetermined angle A is set to such a value that a rotational force acts on said rotor to return to a position in which a boundary between adjacent ones of the plurality of sections having alternately different poles is opposed to a circumferential center of said outer magnetic pole, portion when the boundary shifts from the position.

12. A light amount controller according to claim 11, wherein when the outer peripheral surface of said rotor is circumferentially divided into n sections and has an outer diameter of D1 and an inner diameter of D2, the predetermined angle A is set to satisfy a condition defined by an expression:

$$A > (248.4/n) - 58.86 \times (D1-D2)/(D1 \times \pi).$$

13. A light amount controller according to claim 11, wherein said outer magnetic pole portion has an axial length larger than a height of the outer peripheral surface of said rotor.

14. A light amount controller according to claim 11, including a rotation-preventing member for limiting a rotational angle of said rotor.

15. A light amount controller according to claim 11, wherein said rotor is rotatable through a rotational angle range smaller than an angle corresponding to a circumferential length of each of the plurality of sections having alternately different poles about the rotational axis of the cylindrical shape of said rotor.

16. A light amount of controller according to claim 11, wherein said light amount control member has an ND filter.

17. A light amount of controller according to claim 11, wherein said light amount control member is a shutter blade.

18. A light amount controller according to claim 11, wherein said light amount control member is a diaphragm aperture plate.

* * * * *

UNITED STATES PATENT AND TRADEMARK OFFICE
CERTIFICATE OF CORRECTION

PATENT NO. : 6,727,672 B2
DATED : April 27, 2004
INVENTOR(S) : Masao Mizumaki

It is certified that error appears in the above-identified patent and that said Letters Patent is hereby corrected as shown below:

Column 7,
Line 24, "be" (1st occurrence) should be deleted.

Column 12,
Line 62, "8c." should read -- 8C. --.
Line 63, "8c" should read -- 8C --.

Column 13,
Line 2, "8c" should read -- 8C --.

Column 15,
Line 48, "pole" should read -- pole portion --.
Line 53, "hollow" should be deleted.
Line 63, "pole," should read -- pole --.

Signed and Sealed this

Twentieth Day of July, 2004

JON W. DUDAS
*Acting Director of the United States Patent and Trademark Office*